Aug. 17, 1954  R. J. IFIELD  2,686,498
LIQUID FUEL CONTROL SYSTEM
Filed Nov. 15, 1949
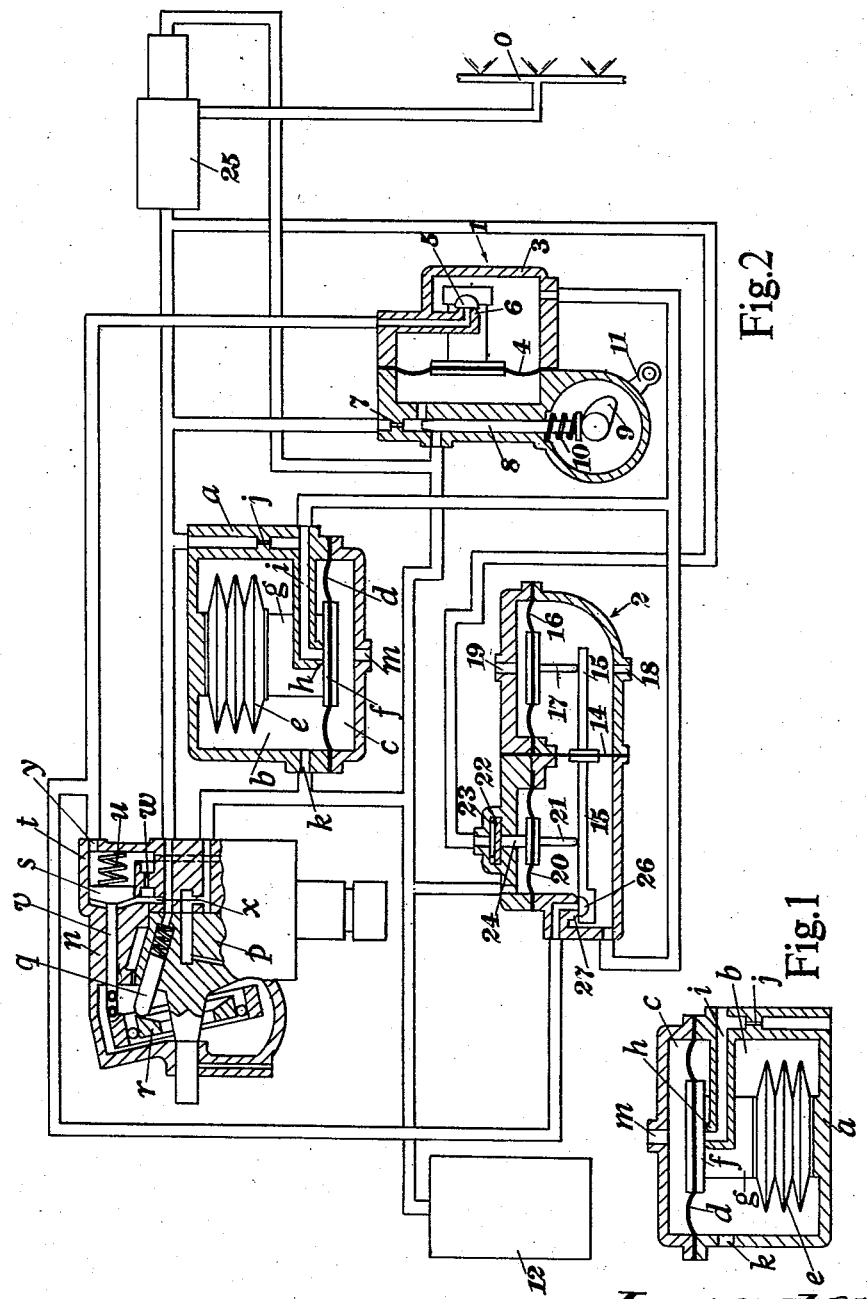

Patented Aug. 17, 1954

2,686,498

UNITED STATES PATENT OFFICE 2,686,498

LIQUID FUEL CONTROL SYSTEM

Richard Joseph Ifield, Dural, New South Wales, Australia, assignor to Joseph Lucas Limited, Birmingham, England Application November 15, 1949, Serial No. 127,356

Claims priority, application Great Britain November 15, 1948

1 Claim. (Cl. 121—38)

This invention relates to a system for supplying liquid fuel to the combustion chamber of a prime mover, and for other purposes. To elucidate the problem to which the invention is directed, there may be cited, by way of example, an arrangement already known for controlling the action of a fluid operated servo-mechanism intended (by its action on a liquid fuel pump or otherwise) to vary the rate of supply of liquid fuel to the combustion chamber. Such a control mechanism is required to be responsive to two or more variable pressures, such as, for example, atmospheric air pressure, the pressure of air supplied by a blower, or the liquid fuel pressure, and moreover it is required that these pressures shall correspond to absolute pressures. To meet this requirement, it is usual to employ an evacuated capsule in association with a diaphragm responsive to any one of such pressures. Thus, if the diaphragm is arranged to transmit blower air pressure to a lever for actuating a valve for controlling the servo-mechanism, an evacuated capsule is arranged to act on the same lever in opposition to the pressure exerted through the diaphragm.

In some forms of control mechanisms it has hitherto been necessary to employ two or more of such capsules in association with different operative parts of the mechanism, and as the use of a multiplicity of capsules is undesirable, there has arisen the need for some equivalent pressure regulating means of a more convenient kind for establishing a standardised pressure which can be transmitted to a plurality of control mechanisms.

The object of the present invention is to enable the said need to be met in a simple and satisfactory manner.

In the accompanying drawings:

Figure 1 is a diagrammatic sectional side elevation of a pressure regulating means for use in a system embodying the invention.

Figure 2 is a diagram illustrating one application of the invention to a liquid fuel supply system.

Referring to Figure 1, there is employed a hollow body part $a$ which is divided into two compartments $b$, $c$, by an elastic diaphragm $d$ (or an equivalent piston). The compartment $c$ at one side of the diaphragm is open to atmosphere through an opening $m$ and is therefore subject to a variable pressure. In the compartment $b$ and acting on the diaphragm in opposition to the atmospheric pressure is arranged an evacuated elastic capsule $e$. Further, in conjunction with the diaphragm and capsule is arranged the closure member $f$ of a valve, which member is carried by the diaphragm and connected to the capsule by a link $g$. The closure member $f$ co-operates with a seating $h$ at one end of a duct $i$ which is supplied with liquid through a restricted orifice $j$ from any convenient source and at any convenient pressure. This duct is also intended to be connected to one or more chambers each having a diaphragm (or piston) required to be subjected on one side to a standardised pressure.

The seating above mentioned opens into the compartment $b$ containing the capsule $e$, and from this compartment liquid allowed to pass the valve can flow through an outlet $k$ to a sump, or the inlet side of a fuel pump.

The mode of action of the above described device is as follows: Variation of atmospheric pressure acting on one side of the diaphragm $d$ results in variation of the opening of the valve, and thereby establishes and maintains a standardised pressure in the associated duct $i$, the said pressure being at all times in fixed relation to the ambient atmospheric pressure. This pressure can be utilised in other parts of a control mechanism for exerting a standardised pressure where otherwise an evacuated capsule would be required, and thus obviates the need for using any other capsules than the one above described.

An example of the kind of system to which the invention is applicable is illustrated at Figure 2, this system serving to supply liquid fuel from a variable delivery pump $n$ to a burner $o$, under the control of various factors to be hereinafter described. The pump is of known kind, in which a rotary body $p$ is provided with plungers $q$ which co-operate with an angularly adjustable swash plate $r$. The latter is automatically adjustable by a liquid-operated servo-mechanism comprising a piston $s$ slidable in a cylinder $t$ and loaded by a spring $u$, the piston being connected to the swash plate by a rod $v$. The two ends of the cylinder are in communication through a restricted orifice $w$, and liquid is supplied by the pump to one end of the cylinder $t$ through a passage $x$. The other end of the cylinder is provided with an outlet $y$ controlled by valves as hereinafter described. The servo-mechanism is such that when this outlet is closed, equal liquid pressures act on the opposite sides of the piston, and the spring then moves the piston to the left, causing the swash plate to be moved to the position of maximum pump delivery. When the outlet is opened, the preponderating liquid pressure on the left hand side of the piston moves the latter against the spring, and by corresponding action on the swash plate reduces the pump output.

The passage $y$ is in communication with two controlling means indicated generally by 1, 2, and it is to these that it is required to supply liquid at a standardised pressure from the device shown in Figure 1 and included in Figure 2. The controlling means shown at 1 includes a hollow body part 3 divided into two compartments by a diaphragm 4 (or equivalent piston) carrying a closure member 5 which co-operates with a valve seating 6 in communication with the passage $y$. One side of the diaphragm 4 is subject to the same liquid pressure as that in the duct $i$ of the pressure-standardising means above described. The other side is subject to the pressure of liquid supplied by the pump through a restricted orifice 7. This pressure is variable by a throttle 8 operable by a cam 9 and spring 10, the cam being rotatable by a manually operable lever 11. Liquid flowing past the throttle is discharged to a tank 12 from which the pump is supplied. When the closure member 5 prevents flow through the seating 6, the piston $s$ of the servo-mechanism moves to the left for increasing the pump output to its maximum. Separation of the closure member from its seating enables the piston $s$ to move towards the right for reducing the pump output to an extent dependent on the difference of liquid pressures acting on the diaphragm 4.

In the control mechanism shown at 2, a hollow body part is divided into two chambers by a flexible diaphragm 14 carrying a valve lever 15. The right hand chamber is divided by a diaphragm 16 (or equivalent piston) to form two compartments, and on the diaphragm is carried a push rod 17 which bears on the lever 15. The lower compartment is open to the atmosphere through the opening 18, and the upper compartment is connected to an air-blower through a pipe attached to the opening 19. The left hand chamber is divided into two compartments by a diaphragm 20 (or an equivalent piston) and on the diaphragm is carried a push rod 21 which bears on the lever 15. Also a diaphragm 22 is provided in a chamber 23, the pressure of fluid in which is transmitted to the diaphragm 20 through a plunger 24. The compartment above the diaphragm 20 is in communication with the tank 12, and the plunger 24 is subject to the pressure of the liquid fuel supplied by the pump. Liquid fuel is conveyed from the pump to the burner $o$ through a pressure regulating valve 25. The compartment beneath the diaphragm 20 is supplied with liquid at standardised pressure from the pressure standardising means above described.

The end of the lever 15 in this compartment is provided with a closure member 26 co-operating with a seating 27 leading to the passage $y$, movement of the closure member under the action of the forces acting on the lever 15 serving to control the servo-mechanism in a manner similar to that of the mechanism shown at 1.

Hitherto it has been usual in a system such as that shown in Figure 2 to provide an evacuated capsule in each of the mechanisms 1, 2. By means of the present invention a single capsule arranged in a mechanism shown in Figure 1 suffices for enabling a standardised or reference pressure to be set-up in any number of mechanisms similar or analogous to those exemplified by 1, 2 in Figure 2.

The invention is capable of being embodied in a variety of systems, but in all cases the system is such that it includes a single device as above described for establishing a standardised pressure in a plurality of control mechanisms.

Having thus described my invention what I claim as new and desire to secure by Letters Patent is:

A system for controlling the supply of liquid fuel from a pump to a combustion chamber, comprising in combination a liquid-operated servo-mechanism, a plurality of control mechanisms each responsive to the difference between a variable fluid pressure and a standardized liquid pressure in fixed relation to ambient air pressure for controlling the said servo-mechanism, and means for supplying liquid at the said standardized pressure to all of the said control mechanisms, the said means comprising the combination of a movable member responsive to ambient air pressure, an opposed elastic and evacuated capsule, a valve operable by the said movable member, and a liquid duct controlled by the said valve, the said duct being in communication with each of the said control mechanisms for permitting access thereto of liquid at the said standardized pressure.

References Cited in the file of this patent

UNITED STATES PATENTS

| Number | Name | Date |
|---|---|---|
| 2,313,002 | Mannesson | Mar. 2, 1943 |
| 2,419,707 | Cooper et al. | Apr. 29, 1947 |
| 2,424,035 | Ifield | July 15, 1947 |
| 2,429,005 | Watson et al. | Oct. 14, 1947 |
| 2,450,881 | Cooper et al. | Oct. 12, 1948 |
| 2,474,033 | Chamberlin | June 21, 1949 |

FOREIGN PATENTS

| Number | Country | Date |
|---|---|---|
| 588,083 | Great Britain | May 14, 1947 |